United States Patent
Bade et al.

(10) Patent No.: US 11,501,549 B2
(45) Date of Patent: Nov. 15, 2022

(54) DOCUMENT PROCESSING USING HYBRID RULE-BASED ARTIFICIAL INTELLIGENCE (AI) MECHANISMS

(71) Applicant: ACCENTURE GLOBAL SOLUTIONS LIMITED, Dublin (IE)

(72) Inventors: Sawani Bade, Bangalore (IN); Srinivasan Ponpathirkoottam Raghavan, Chennai (IN); Samatha Kottha, Bangalore (IN); Shruti Chhabra, Ghaziabad (IN); Praneeth Medhatithi Shishtla, Hyderabad (IN); Debayan Chakraborty, Bangalore (IN); Sreerekha T. V., Bangalore (IN); Himani Bhatt, Bangalore (IN); Amit Nandi, Bangalore (IN); Akanksha Juneja, Dwarka (IN); Soubhagya Ranjan Mohapatra, Bangalore (IN); Ashok Kumar Shivarajan, Krishnagiri (IN); Kedar Bhat, Mumbai (IN); Karthick Selvamuthukumaran, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 250 days.

(21) Appl. No.: 16/917,572

(22) Filed: Jun. 30, 2020

(65) Prior Publication Data

US 2021/0357633 A1    Nov. 18, 2021

(30) Foreign Application Priority Data

May 13, 2020   (IN) .............................. 202011020190

(51) Int. Cl.
*G06F 30/00*    (2020.01)
*G06V 30/413*   (2022.01)
(Continued)

(52) U.S. Cl.
CPC .......... *G06V 30/413* (2022.01); *G06F 40/284* (2020.01); *G06V 30/412* (2022.01); *G06V 30/414* (2022.01)

(58) Field of Classification Search
CPC .. G06V 30/413; G06V 30/412; G06V 30/414; G06F 40/284
See application file for complete search history.

(56) References Cited

U.S. PATENT DOCUMENTS 10,489,682 B1 * 11/2019 Kumar ................. G06V 30/414
11,176,443 B1 * 11/2021 Selva .................... G06N 3/0454
(Continued)

FOREIGN PATENT DOCUMENTS

EP    2343670 A2    7/2011
WO   WO-2017069741 A1 *   4/2017

OTHER PUBLICATIONS

Holecek, et al, "Table understanding in structured documents", Jul. 9, 2019, Charles University, 7 Pages.*
(Continued)

*Primary Examiner* — William L Bashore
*Assistant Examiner* — David Faber
(74) *Attorney, Agent, or Firm* — Mannava & Kang, P.C.

(57) ABSTRACT

A hybrid rule-based Artificial Intelligence (AI) document processing system processes a non-editable document with at least one invoice to accurately extract data from tables in the invoices. The non-editable document is preprocessed for conversion into a markup format and pages including the invoice are identified. The invoice is processed via a document process by parsing the pages in different directions to generate a first set of predictions and via a block process wherein logical information blocks from the invoice are processed to generate a second set of predictions. The missing entries from a selected table are identified by (Continued)

applying rules to the first set of predictions and the second set of predictions. Any discrepancy between the missing entry values between the first and second set of predictions are resolved and the resulting data is exported to downstream systems for further uses.

20 Claims, 12 Drawing Sheets

(51) Int. Cl.
*G06F 40/284* (2020.01)
*G06V 30/412* (2022.01)
*G06V 30/414* (2022.01)

(56) References Cited

U.S. PATENT DOCUMENTS

| | | | | |
|---|---|---|---|---|
| 2014/0258059 | A1* | 9/2014 | Sekine | G06Q 30/06 705/34 |
| 2014/0369602 | A1* | 12/2014 | Meier | G06V 30/412 382/182 |
| 2015/0039707 | A1* | 2/2015 | Gregg | G06Q 30/04 709/206 |
| 2016/0070693 | A1* | 3/2016 | Carrier | G06F 16/3329 707/755 |
| 2019/0087395 | A1 | 3/2019 | Priestas et al. | |
| 2019/0370388 | A1* | 12/2019 | Li | G06F 16/2365 |
| 2020/0074515 | A1* | 3/2020 | Ghatage | G06N 20/00 |
| 2020/0097451 | A1* | 3/2020 | Pisipati | G06F 16/258 |
| 2020/0104587 | A1* | 4/2020 | Bhatnagar | G06F 16/2365 |
| 2020/0175267 | A1* | 6/2020 | Schäfer | G06V 30/18057 |
| 2021/0012102 | A1* | 1/2021 | Cristescu | G06K 9/6271 |
| 2021/0174297 | A1* | 6/2021 | Toldo | G06Q 20/102 |
| 2021/0406533 | A1* | 12/2021 | Arroyo | G06F 16/5846 |

OTHER PUBLICATIONS

Paliwal, "TableNet: Deep Learning model for end-to-end Table detection and Tabular data extraction from Scanned Document Images", Jan. 6, 2020, 6 pages.*
Sable, "Building Custom Deep Learning Based OCR models", Sep. 12, 2019, Nanonets, 32 pages + 1 page.*
Sable, "Automating Invoice Processing with OCR and Deep Learning", Sep. 19, 2019, Nanonets, 23 pages + 1 page.*
Larsson et al., "Automated invoice handling with machine learning and OCR", 2016, KTH Royal Institute of Technology School of Technology and Health, 68 pages.*
Kurama, "Table Detection, Information Extraction and Structuring using Deep Learning", Jan. 22, 2020, Nanonets, 44 pages + 1 page.*

* cited by examiner

700

LOREM  LOREM IPSUM DOLOR
LOREM IPSUM DOLOR SIT AMET          LOREM IPSUM                                          702
UT WISI ENIM AD MINIM VENIAM          UT WISI      UT WISI ENIM AD MINIM
IRIURE DOLOR IN HENDRERIT IN VULPUTATE         IRIURE DOLOR IN HENDRERIT   0351
ODIO DIGNISSIM QUI BLANDIT PRAESENT            ODIO DIGNISSIM 8932323                    704

| ODIO DIGNISSIM QUI BLANDIT PRAESENT LUPTATUM ZZRIL ||| 50127495 |
|---|---|---|---|
| NULLA FACILISI ||||
| DIGNISSIM QUI BLANDIT ||||
| LOREM IPSUM DOLOR SIT AMET, CONSECTETUER ||||
| TINCIDUNT UT ||||
| NOSTRUD EXERCI TATION ULLAMCORPER ||||
| CONSEQUAT. DUIS AUTEM ||||
| ODIO DIGNISSIM    2123243 ||||
| LOREM IPSUM DOLOR SIT UT WISI ENIM AD MINIM VENIAM, QUIS | LOREM IPSUM | LOREM IPSUM DOLOR SIT AMET | 24.07.2018 IPSUM DOLOR |
| ||| LOREM IPSUM |
| SWB-NO.                  GN180717156 | | 714 | 716  706 |
| SHIPMENT     47472718      FCL/FCL | | | |
| HANSA HOMBURG | | | SAILING 23.07.2018 |
| MANHATTAN BRIDGE | 225S/215135 015W/215301 | | SAILING 02.08.2018 |
| FROM HO   CHI   MINH   CITY | LA SPEZIA | | |
| PHI VAN DON | 1 BIL | 700000 VND | 700000 |
| 01 CONT. 40' X 9'6" HIGH CUBE | CONT. | | |
| UACU  5598187             712 | | | |
| C/PHI BEN BAI XUAT | 1 CTR | 3150000 VND | 3150000 |
| PHI NIEM CHI | 1 CTR | 170000 VND | 170000 |

LOREM IPSUM DOLOR ................................................. LOREM .................. 4.020.000
TINCIDUNT UT LAOREET DOLORE ............... 4.020.000 ✕ LOREM .................. 211.452
NOSTRUD EXERCI TATION ........................................... LOREM .................. 4.231.452
LOREM IPSUM DOLOR
SIT AMET, CONSECTETUER ADIPISCING ELIT, SED DIAM NONUMMY NIBH EUISMOD
TINCIDUNT UT LAOREET         DOLORE MAGNA ALIQUAM            EXERCI TATION

*FIG. 7*

VAT NO.0595138 — 806

808

BILL OF LACING: SSZ 1412    BOOKING REF: SSZ0547451
CUSTOMER: 000125
YOUR REF: 0A104-C

INVOICE 802    LOREM IPSUM
BREX14051
LOREM IPSUM

LOREM:

SQUIRREL CORP.
AVENIDA PAULISTA
CONJ 121
BAIRRO BELA VISTA
SAO PAULO/0
BRAZIL
TEL:551137080068 FAX:

804

LOREM: IPSUM DOLOR
SIT
AMET ELIT,
SED DIAM NIBH
EUISMOD DOLORE
MAGNA ALIQUAM

LOREM IPSUM                LOREM IPSUM

| LOREM IPSUM | DOLOR SIT AMET | CONSECTETUER | ADIPISCING ELIT |
|---|---|---|---|
| SED DIAM NONUMMY NIBH DOLORE VOLUTPAT    UT WISI ENIM    VENIAM QUIS NOSTRUD    CORPER SUSCIPIT    EX EA COMMODO CONSEQUAT.    EUM IRIURE | | EUISMOD TINCIDUNT MAGNA AD MINIM EXERCI TATION ULLAM LOBORTIS NISL UT ALIQUIP DUIS AUTEM VEL DOLOR IN HENDRERIT IN | UT LAOREET ALIQUAM ERAT |
| VULPUTATE | VELIT ESSE | MOLESTIE | CONSEQUAT |
| 380510 | ILLUM DOLORE EU | FEUGIAT | 3 |

810 — CONTAINER NUMBER(S): DHDU1378  UTTU1240  UTTU2416

| ADIPISCING  ELIT SED DIAM | NONUMMY | NIBH | EUISMOD | TINCIDUNT |
|---|---|---|---|---|
| UT LAOREET DOLORE | MAGNA | ALIQUAM | ERAT | VOLUTPAT |
| UT WISI ENIM AD MINIM | VENIAM | QUIS | NOSTR | EXERCI |
| TATION ULLAMCORPER | SUSCIPIT | LOBORTIS | NISL | ALIQUIP |
| | | | EX EA COMMODO | |

*FIG. 8*

| | | | | |
|---|---|---|---|---|
| VOYAGE: 236AAE | LOCAL VOYAGE REF: - | VESSEL: VALENCE | | CALL DATE: 08 SEP 2017 |
| EXPORT CARGO MODE: MERCHANT HAULAGE | | IMPORT CARGO MODE: MERCHANT HAULAGE | | |
| PLACE OF RECEIPT: - | | DISCHARGE PORT: NINGBO | | |
| LOAD PORT: RIO GRANDE | | PLACE OF DELIVERY: - | | |
| SHIPPER: MAHJONG INC.<br>CEP:11013020 TEL.: (13) 210-477 | | COSIGNEE: MAHJONG INC.<br>NINGBO 315000 - CHINA | | |
| FREIGHT FORARDERS: MAHJONG INC.<br>SANTOS SP | | NOTIFY: SINOTRANS CHEMICAL INTERNATIONAL<br>315000 JACKY CHEN TEL.:+865748185 EM | | |
| COMMODITY CODE: | DESCRIPTION | PACKAGE | | QTY |
| 380510 | GUM, WOOD OR SULPHATE TURPENTI | 20TK | | 3 |
| CONTAINER NUMBER(S): DHDU13781 UTTU12403 UTTU24169 | | | | |
| SIZE/TYPE CHANGE DESCRIPTION | BASED ON | RATE CURRENCY | AMOUNT | AMOUNT IN USD |
| 20TK C BASIC FREIGHT | 3 UNI | 700.00 USD | 2,100.00 | 2,100.00 |
| 20TK C DANGEROUS GOODS ADDITIONAL (SEA). | 3 TEU | 100.00 USD | 300.00 | 300.00 |
| 20TK C OCEAN CARRIER-INTL SHIP & PORT FACILITY SECURITY | 3 UNI | 12.00 USD | 36.00 | 36.00 |
| | | CURRENCY CHARGE TOTALS | | |
| | | USD | 2,436.00 | |
| | | | TOTAL | 2,436.00 |

Labels: 902, 904, 906, 908; 900

*FIG. 9*

| 1002 | | 1004 | 1006 | 1008 | 1012 | 1014 |
|---|---|---|---|---|---|---|
| SIZE/TYPE | | CHARGE DESCRIPTION | BASED ON | RATE CURRENCY | AMOUNT | AMOUNT IN USD |
| 20TK C | | BASIC FREIGHT | 3 UNI | 700.00 USD | 2,100.00 | 2,100.00 |
| 20TK C | | DANGEROUS GOODS ADDITIONAL (SEA) | 3 TEU | 100.00 USD | 300.00 | 300.00 |
| 20TK C | | OCEAN CARRIER-INT'L SHIP & PORT FACILITY SECURITY | 3 UNI | 12.00 USD | 36.00 | 36.00 |
| | | | | CURRENCY CHARGE TOTALS | | |
| | | | | USD | 2,436.00 | |
| | | | | TOTAL | | 2,436.00 |

DOCUMENT PROCESSING USING HYBRID RULE-BASED ARTIFICIAL INTELLIGENCE (AI) MECHANISMS

PRIORITY

The present application claims priority under 35 U.S.C. 119(a)-(d) to Indian Non-Provisional Patent Application number 202011020190, having a filing date of May 13, 2020, the disclosure of which is hereby incorporated by reference in its entirety.

BACKGROUND

Documents serve to archive and communicate information. Document processing is an activity related to recording the information on some persistent medium which can include paper or electronic versions of the documents can be stored in machine readable media such as hard drives, Universal Serial Bus (USB) storage devices or remote storages such as those on the cloud. Computers are extensively used in document management systems to store, manage and track the electronic documents. Electronic storage of information in the paper documents has enabled evolution of robotic process automation (RPA) systems that automate certain administrative functions. Usage of computers for document management requires conversion of the paper documents into their electronic format for manipulation, storage and transmission and hence, techniques for accurate extraction of data from the electronic version of the paper documents, editable or non-editable need to be developed.

BRIEF DESCRIPTION OF DRAWINGS

Features of the present disclosure are illustrated by way of examples shown in the following figures. In the following figures, like numerals indicate like elements, in which:

FIG. 7 shows an example invoice page that is analyzed in accordance with the examples disclosed herein.

FIG. 8 shows a diagram including another invoice illustrating the various aspects of document analysis by a document processor and a block processor in accordance with the examples disclosed herein.

FIG. 9 shows an invoice with different tables and a table that is selected for further processing in accordance with the examples disclosed herein.

FIG. 10 shows an invoice that is processed for alignment accuracy for tabular information in accordance with the examples disclosed herein.

DETAILED DESCRIPTION

Figure 1:
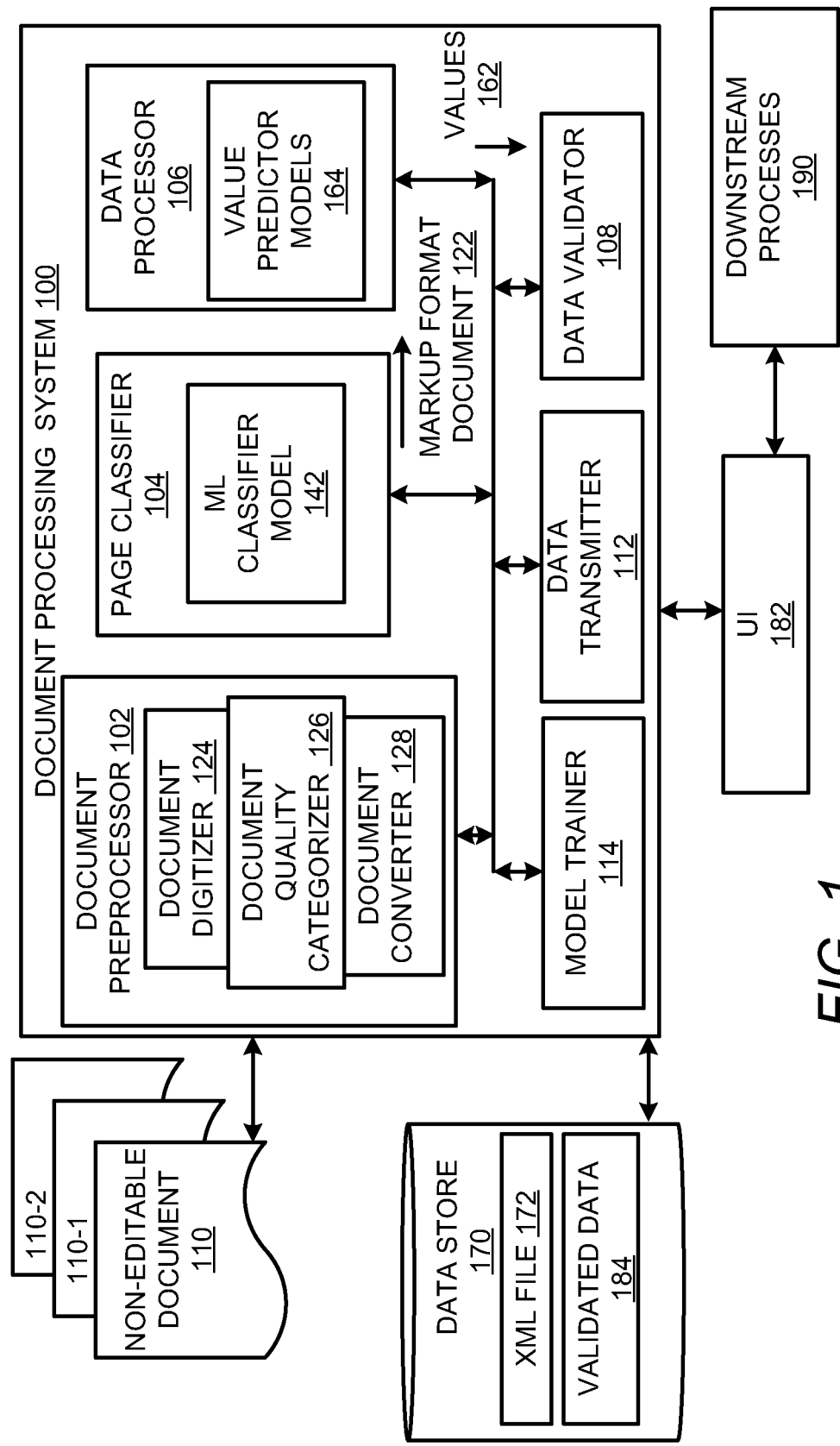
FIG. 1 shows a block diagram of a hybrid rule-based Artificial Intelligence (AI) document processing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A hybrid rule-based artificial intelligence (AI) document processing system that extracts data from error-prone, non-editable or editable documents in a manner that compensates for the errors and provides the extracted, validated data in a format that is readily consumable by downstream systems such as RPA systems is disclosed. The document processing system receives a non-editable document which may have multiple pages. The multiple pages include documents with one or more tables such as an invoice with goods and/or services itemized. Within the various tables, an invoice is based on a main table which generally includes a table with serial numbers, items/service descriptions and amounts for the items/services. Furthermore, if the non-editable document includes multiple pages, it is not necessary that all the multiple pages include invoices. In fact, generally invoices are accompanied by other information such as cover letters, print outs with proofs of goods deliver/services rendered, screen captures from computers in image formats, etc. Hence, the document processing system is configured to preprocess the non-editable document via different procedures.

The non-editable document is initially digitized via optical character recognition (OCR). A page quality categorizer including a machine learning (ML) component such as a convolution neural network (CNN) that is trained via supervised techniques can be used for determining the quality of the non-editable document. If the non-editable document is determined to be of lower quality, then such low-quality document may be categorized for processing by human operators. Low quality non-editable documents can include documents with highly complex tables, documents with stamps, or documents with salt and pepper noise, etc. If the non-editable document is determined to be of good quality, then the digitized version of the non-editable document is converted to a markup version such as a HTML (Hypertext Markup Language) using tools that are configured for such conversions. A markup version thus generated is further processed by a page classifier to identify pages which include the invoice(s). The page classifier can include a ML classifier model that is trained with annotated data that includes the pages with invoices and pages without invoices. The pages including the invoice are extracted and a markup format document which is the markup version of the invoice pages is forwarded for further processing.

The markup format document is processed serially or simultaneously via two processes which include a document process and a block process. Although the initial input and the subsequent steps that occur during the document process and the block process are identical, the processes differ in the manner in which the input is initially extracted. The markup format document is parsed in different directions such as top to bottom and left to right and the resulting tokens are analyzed during the document process. The block process identifies different logical information blocks within the markup format document wherein each of the logical information blocks includes an entity label and a probable value for the entity. A set of document feature sequences including textual feature sequences and positional feature sequences are generated from the tokens or phrases in the text containers of the markup format document. The textual feature sequences include, for each token, a first predetermined number of preceding tokens, a second predetermined number of succeeding tokens and type of data in the tokens. The positional feature sequences for the tokens can be determined from a coordinate based matrix wherein each letter, symbol or number is defined in terms of position coordinates that represent position of the letter, symbol or the number within a page of the invoice in the non-editable document. Therefore, include for each token, the position coordinates indicate an extent of the token within the invoice, wherein the extent is defined by position coordinates of a top left pixel identifying a beginning of the token and a bottom right pixel identifying an end of the token.

The feature sequences thus generated are provided to one or more ML models that are trained in predicting or identifying labels and values of the document header fields and table headers and line items for the tables in the invoice. The ML models can be trained using explicitly labelled training data which may include prior invoices that have annotated labels and values of document header fields and line items. More particularly, the ML models include sequence labelling models like one or more conditional random field (CRF) models or Long Short Term Memory (LSTM) models. During the document process, the document feature sequences are provided to one or more document value predictor models. The document value predictor models are trained via supervised learning for the extraction of labels and values of the headers and the line items. More particularly, the training data for the document value predictor models can include editable documents (e.g., documents after the OCR), with the entities labels and entity values annotated. In an example, multiple document value predictor models can be used for analyzing the feature sequences in order to improve accuracy. A first set of predictions are generated for the headers and the line items of the tables from the document value predictor models using the set of document feature sequences. If the invoice has multiple tables, then one of the tables with a maximum number of horizontally-aligned headers from the first set of predictions is selected. A first set of values for missing entries in the selected table are obtained by aligning text containers, that include tags like DIV (division) tags from the markup format document, horizontally and vertically. The alignment of the text containers is based on the headers predicted by the document value predictor models. The predicted table headers provide the upper boundary of the table while a configurable list of most commonly occurring keywords indicating the end of an invoice indicate the lower boundary of the table. The left and right extremities of the table are obtained by the positions of the leftmost and rightmost table headers present in the table being processed, from the configurable list of table headers of interest The block process is similar to the document process. However, the tokens for generating a set of block feature sequences are obtained from the blocks. A second set for predictions for the headers and the line items of the tables are generated from the block value predictor models using the set of block feature sequences. Again, if the invoice has multiple tables, then one of the tables with a maximum number of horizontally-aligned headers from the second set of predictions is selected. A second set of values for the missing entries in the selected table are obtained by aligning text, containers defined by the div tags in the markup format documents, horizontally and vertically wherein the alignment of the text containers is based on the headers predicted by the block value predictor models.

If there are any discrepancies in the corresponding values for any of missing entries for the specific headers or line items in the first set of values and the second set of values, then the discrepancies are resolved either via using preconfigured settings or via a voting mechanism. Also, if the invoice spans multiple pages, then the entities and entity values are consolidated over the pages. Further post-processing techniques such as data clean up and transformations of specific fields such as dates/currencies into desired formats, etc. are also implemented. When the extracted data is thus completed, it is validated and provided in a requisite format to downstream processes. For example, a downstream process can include RPA systems wherein the data extracted from the invoice may be provided in a spreadsheet format or a comma separated values (CSV) format etc. In another example, the downstream process can include an enterprise resource planning (ERP) system and the extracted data can be posted to the appropriate databases of the ERP systems.

The rule-based AI document processing system disclosed herein affords a technical improvement in document processing systems as it provides technical solutions to the various technical problems associated with automatic document processing systems. An automatic document processing system can enable automated functions for further downstream processes by extracting data from different documents and providing the extracted data to these downstream processes. As a result, the quality and efficiency of the document processing system is dependent on the speed and accuracy with which the data is extracted from the documents. Various examples are discussed herein in the context of invoices but it can be appreciated that the technical solutions that are outlined herein can be applied to any document processing system that processes documents with multiple tables that are encoded in non-editable format and are to be processed for data extraction. Moreover, documents with information such as invoices are generated in numerous formats in a variety of templates. There is no specific template that is followed by all the organizations. In fact, the same organization may use different invoice templates in different geographies based on the regulatory requirements. Even if the invoices maintain standard templates, they are prone to errors with misaligned line items which should have been aligned with one column but appear aligned with an adjacent column due to inconsistent spacing issues, amount line items which may or may not include taxes or which may be of different currencies, and overflowing tables wherein the line items from one column spill over into the next column. Moreover, the invoices may also include noises wherein relevant entities may or may not be overlapping. Reading order is another consideration that arises during data extraction from documents. A document may be generally read from top to bottom and from left to right. However, documents which present data in the form of structures such as tables, boxes, etc., may have a different reading order. For example, the reading order for a document with multiple boxes progresses from one box to another. Therefore, inaccurate information can be extracted from documents using data extraction techniques that do not consider the reading order of the documents.

Due to the various problems as outlined above, simple OCR fails to accurately extract the line items from tables included in documents such as the invoices. The constant changes in invoice formats from different organizations and different geographies further exacerbate the low accuracy of the OCR based systems. As a result, the simple OCR based systems failed to provide the necessary details that are required for the downstream systems such as the ERP systems or the RPAs to function smoothly. The document processing system disclosed herein provides for a hybrid system includes ML techniques for predicting entities and entity values while applying rules for better delineating the alignment of line items thereby improving data extraction speed and accuracy as compared to other systems that are either rule-based or based on ML techniques alone. The implementation of a document process that processes entire documents for sequential data extraction using document value predictor models and a block process for a structure-based data extraction using block value predictor models provides a flexible approach to information extraction so that the data extracted with such mixture of models is more accurate as compared to information extraction by one or the other models. Moreover, application of rules on top of ML output, enables effecting data transformations as required for various reasons such as data compatibility with the downstream systems or downstream processes.

FIG. 1 shows a block diagram of a hybrid rule-based AI document processing system 100 that processes a non-editable multi-page document 110 to identify one or more invoices 110-1, 110-2, etc. that form a part of the non-editable document 110, extracts the data required for downstream processes 190 such as RPA from the invoices 110-1, 110-2 and provides the extracted data upon validation to the downstream processes 190. The non-editable document 110 can include files of different formats such as but not limited to, scanned papers, screen shots captured via imaging devices, word processing documents with textual or numeric data, etc. In particular, the non-editable document 110 would include the invoices 110-1, 110-2 which can be confined to one page or can span multiple pages. Each of the invoices 110-1, 110-2 can be identified by a unique invoice number and an invoice can be characterized by one or more tables that can include line items with textual, numeric or even alpha-numeric data. For example, the different tables can include, for example, one or more tables with header information such as the invoice number, date, etc., a table with different addresses pertaining to different organizations associated with the invoices with the addresses that are spaced apart positionally within the invoice page(s), a table with tax information, a table that may list terms and conditions, etc. Generally, the upper portion or the header of an invoice can include a table with the details such as names and addresses associated with the invoice, the middle portion or the body of the invoice can include the main tables with columns such as serial numbers, decryptions, sub-amounts and total amount(s) while the lower portion may include a table that may list terms and conditions, etc. Invoices therefore include considerable data that needs to be extracted and turned into appropriate formats for downstream processes such as RPAs or downstream tools such as CRMs, ERPs etc. can consume to execute further tasks. As mentioned herein, the invoices 110-1, 110-2, etc. in the non-editable document 110 can include various errors such as contents in various formats, misaligned line items, overflowing tables, fields which may have the same labels but which may represent different quantities, etc. The document processing system 100 represents an improvement in that it is configured to extract data accurately from such erroneous documents.

The document processing system 100 includes a document preprocessor 102, a page classifier 104, a data processor 106, a data validator 108, a data transmitter 112 and a model trainer 114. The document preprocessor 102 executes various processes for preparing the non-editable document 110 for information extraction. The various processes can include digitization to convert the non-editable document 110 into editable format (e.g., editable pdf) which can be executed by a document digitizer 124, a document quality categorizer 126 which identifies quality of the non-editable document 110 and a document converter 128 that converts the non-editable document 110 into markup format. Further, the page classifier 104 identifies the pages including the invoices 110-1, 110-2. Further discussion below may refer to only one of the invoices 110-1, 110-2, e.g., the invoice 110-1, however, it can be appreciated that similar processing can be executed on the other invoices 110-2, etc. which may be included in the non-editable document 110. The document digitizer 124 can implement processes like OCR for digitizing data from the non-editable document 110 so that the data can be analyzed by other processes implemented by the document processing system 100. In an example, the non-editable document 110 can include scanned pages received in an image format such as non-editable pdf, .jpeg, .gif, etc. which are then converted into a machine-readable format by the document digitizer 124.

The digitized data is accessed by the document quality categorizer 126 which can generate a rating for the non-editable document 110 so that non-editable documents with low quality invoice pages can be filtered for manual processing. In an example, the document quality categorizer 126 can include a convolution neural network (CNN) for categorizing the non-editable document 110 into one of a plurality of predetermined document quality categories based on the output from the document digitizer 124. The plurality of predetermined document quality categories can include but are not limited to, stamp present (i.e., document which include seals or stamps), complex tables, or high quality documents. The non-editable document 110 when categorized as a high quality document can be passed on for further processing. In an example, the document quality categorizer 126 can also be used to filter training data for training the various ML models used by the document processing system 100 as the model quality can be dependent on the quality of training data. If the non-editable document 110 is categorized for automatic processing, the digitized data is provided to the document converter 128 which can include a tool such as pdf2text, pdf2htmlex or pdf2xml for converting the digitized version of the non-editable document 110 into a markup format. The digitized data from the non-editable document 110 is arranged in a similar template with the use of markup tags.

The markup format is then accessed by the page classifier 104 which classifies different pages of the non-editable document 110 into two categories—the invoice pages and the non-invoice pages. The page classifier 104 can include a ML classifier model 142 which can be explicitly trained using labelled data for classifying or categorizing pages from the non-editable document 110 in the markup format into invoice pages and non-invoice pages. In many instances, invoices can be accompanied by extraneous material in various file formats, such as adverts, copies of communications, cover letters, etc. If such extraneous material is filtered out at the outset, it can make the remaining parts of the document processing system 100 much more efficient as it would mitigate the need for training the document processing system 100 to process such extraneous communications. Therefore, the document preprocessor 102 along with the page classifier 104 receives the non-editable document 110 as input and outputs a markup version of the invoice 110-1 or a markup format document 122 for further processing. It may be noted that the invoice 110-1 can include multiple pages. The markup format document 122 can include the data from the invoice 110-1 arranged using markup tags to similarly span multiple pages. The markup format document 122 can include a .html version, a .xml version, or indeed any markup language version of the invoice 110-1.

The markup format document 122 is provided to a data processor 106 which identifies entities and field values associated with the entities from the markup format document 122. The data processor 106 can process the markup format document 122 in at least two different methodologies for accurate data identification. These methodologies include the document process and the block process. The document process analyzes the markup format document 122 as a single document by parsing it in different directions e.g., left to right and top to bottom. The block process analyzes the markup format document 122 as a collection of logical data groupings. Each process works efficiently in identifying field values for different entities which may be arranged in different ways in a given invoice template. For example, while the document process works better for the identification of the field values arranged adjacent to each other, the block process works better when the field values are arranged below a corresponding header. Certain example fields such the 'bill of lading' which may occur in logistic invoices can be preconfigured to be processed as the document process since the value for the bill of lading field almost always occurs adjacent to the label identifying such as value. Different operations occur in a serial order as detailed herein when the markup format document 122 is processed via the block process and the document process.

The data processor 106 includes one or more ML models for identifying entities and entity values within the headers and line items from the markup format document 122. Furthermore, the data processor 106 is configured for filling in the missing values for any of the headers and/or line items. Various ML models such as one or more of convolution neural networks (CNNs). Long Short Term Memory (BiLSTM), or CRF can be used by the data processor 106. In an example, sequence labelling value predictor models 164 can be trained to process values from the document process and the block process. CRFs are a type of discriminative classifiers that model decision boundaries between different classes. Examples can include logistic regression based on maximum likelihood estimation. Moreover, multiple value predictor models can be employed to identify entities and entity values for each of the document process and the block process. By way of illustration and not limitation, if forty two entities are to be processed using each of the document and the block processes, three four models can be employed for each process with each model being trained to identify fourteen entities selected on the basis of their collocation or type. It was observed that using multiple models for the identification of the entities improves accuracy. For example, using three value predictor models to identify the forty two entities improved accuracy by five percent as compared to training one model to identify all the forty two entities.

A model trainer 114 is also included in the document processing system 100 which trains the value predictor models 164 within the data processor 106 for identifying data values extracted from the non-editable document 110. The model trainer 114 employs labelled data for supervised training of the value predictor models 164. The labelled training data can include both labelled fields and field values. Furthermore, each field may have many similar sub-fields. For example, an amount field may have sub-total field, a tax field, a total amount field. Similarly, multiple entity names such as an entity issuing the invoices and an entity for which the invoices are issued and the corresponding addresses may be also be included. Each of these field labels (e.g., entity names, table headers, etc.) and field values (entity values or line items) are explicitly labelled within the training data.

When different values are predicted for an entity or for particular line items from a table via the document process and the block process, one of the values can be selected for further processing via a voting procedure using the confidence score given by the ML algorithms used in both document and block processes. The field values can be consolidated over the multiple pages by the data processor 106. For example, values common to the different pages such as the invoice id can be consolidated over the multiple pages for a multi-page invoice.

The values 162 thus extracted can be sent to a data validator 108 which can include a UI 182. The values 162 can be transmitted as an XML file 172, for example, which may be stored in a data store 170 that includes a non-transitory processor-readable storage medium and further used to populate the UI 182 for human review and validation. In an example, explicit human review can be further employed as explicit data for training the data processor 106. The validated data 184 can also be stored to system storages such as CRMs, ERPs. The validated data 184 can be further employed by other downstream processes such as RPAs.

Figure 2:
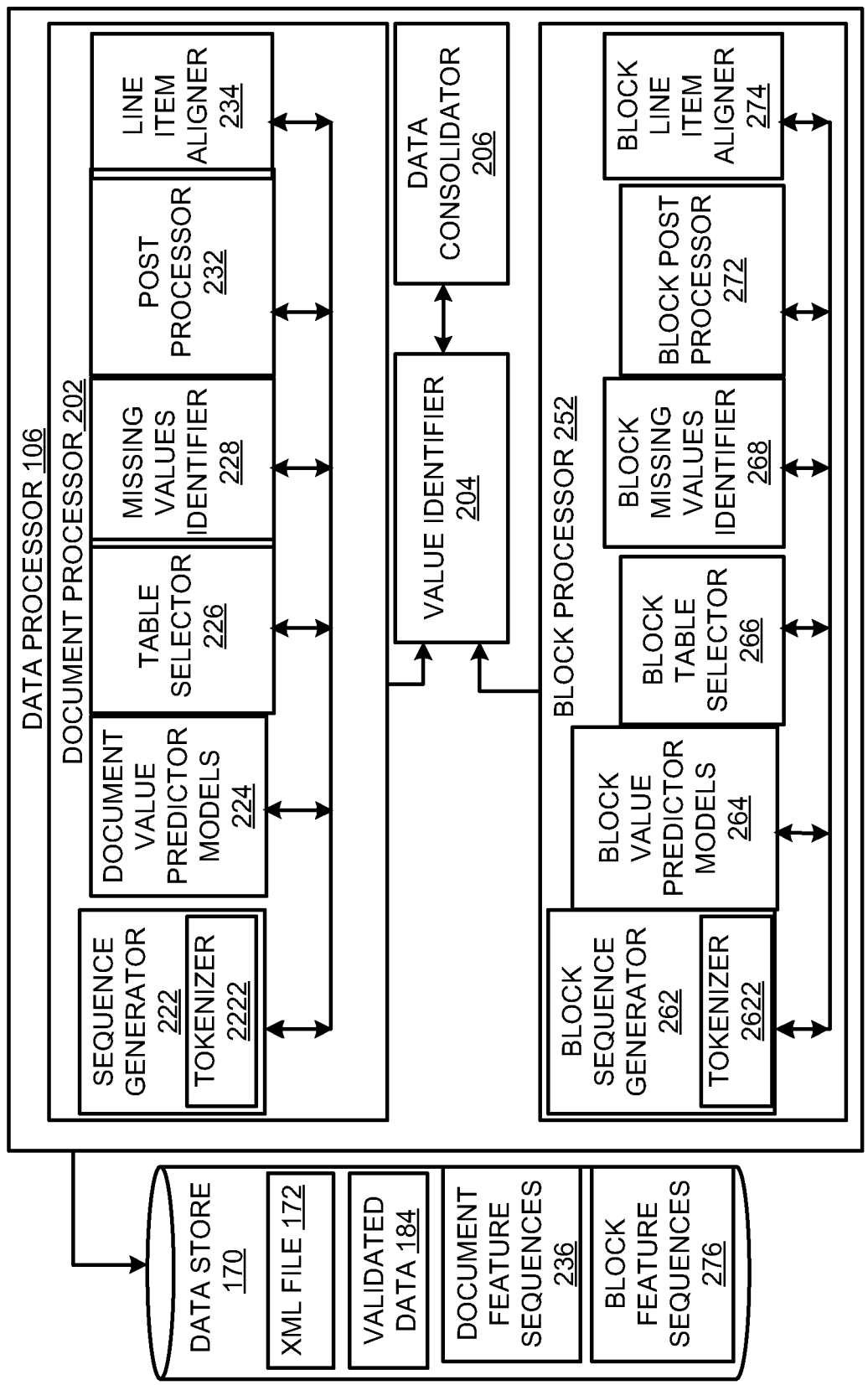
FIG. 2 shows the details of a data processor in accordance with the examples disclosed herein.

FIG. 2 shows the details of the data processor 106 in accordance with the examples disclosed herein. The data processor 106 includes a document processor 202 that implements a document process wherein the invoice 110-1 is parsed and processed in different directions, e.g., from left to right and top to bottom for entity label and entity value extraction. The data processor 106 also includes a block processor 252 which processes the invoice 110-1 in terms of logical blocks that represent logical information units in the non-editable document 110. The entity values or field values and line items that are obtained from the document processor 202 and the block processor 252 are provided to a value identifier 204 which may resolve any mismatches between the field values and the line items provided by the document processor 202 and the block processor 252. The data from the value identifier 204 is provided to the data consolidator 206 which consolidates data across the various pages of the invoice 110-1. The consolidated values (i.e., the values 162) are provided to the data validator 108 for subsequent processing as described above.

While the document processor 202 and the block processor 252 include similar processing components, the manner in which the invoice 110-1 is processed differs as described herein. The document processor 202 includes a sequence generator 222, one or more value predictor models 224 based on CRF, LSTM or other sequence labelling methodology, a table selector 226, missing values identifier 228, a post processor 232 and a line item aligner 234. The block post processor 252 also includes a block sequence generator 262, one or more block value predictor models 264, a block table selector 266, a block missing values identifier 268, a block post processor 272 and a block line item aligner 274. In an example implementation, the invoice 110-1 is processed or parsed in a predetermined direction, a tokenizer 2222 generates tokens from the markup format document 122 and the tokens are supplied to the sequence generator 222. Similarly, as the logical data structures identified by the block processor 252 are processed, a tokenizer 2622 included in the block sequence generator 262 generates the corresponding tokens. In an example, the logical data structures or 'blocks' can be defined by the document converter 128 such as a pdftohtmlex that converts the non-editable document 110 to a markup based format. More particularly, class attributes of the DIV tags have "x" and "y" values within the markup format document 122. The section of the document between a pair of corresponding DIV tags (i.e., <DIV>, </DIV>) can be referred to as a "div" and/or "dies" with the same x values within the document can be marked as one block.

As value predictor models use contextual information from previous labels, the sequence generator 222 generates a set of document feature sequences 236 while the block sequence generator 262 generates a set of block feature sequences 276. Both the set of document feature sequences 236 and the set of block feature sequences 276 can include textual feature sequences and positional feature sequences. The textual feature sequences include the prefix associated with a token under consideration, sequences of tokens that include a predetermined number of tokens preceding and succeeding the token under consideration, the type of data in the token under consideration e.g., whether the token includes only letters, only numbers or a combination of both, etc. Thus, tokens generated from the text contained between two successive DIV tags can be considered as a textual sequence. Positional sequences can include position information of the token within a page of the invoice which can be expressed as the (x, y) position coordinates of a top left pixel identifying a beginning of the token and a bottom right pixel indicative an end of the token. The top-left coordinates of the DIV tag containing the text sequences can be used as the positional sequences.

The set of document feature sequences 236 thus generated by the sequence generator 222 and the set of block feature sequences 276 obtained from the block sequence generator 262 are correspondingly provided to the value predictor models 164 which include the document value predictor models 224 and the block value predictor models 264. As mentioned above, multiple value predictor models 164 can be trained for each of the document process and the block process so that each value predictor model processes a subset of the corresponding feature sequences. The document value predictor models 224 generate a first set of predictions including predicted values and confidence scores associated with the predicted values for one or more of the headers and the line items using the tokens that form entity names or field labels and the tokens that form the corresponding entity values or field values. Similarly, the block value predictor models generate a second set of predictions including predicted values and confidence scores associated with the predicted values for one or more of the headers and the line items using the tokens from the tokenizer 2622. Various entity names such as the issuer of the invoice 110-1, the address of the addressee of the invoice 110-1, the various table headers and line item values are predicted by the value predictor models 164.

Generally, invoices can include multiple tables which can make the extracted data noisy with extraneous information. Therefore, a table selector 226 and a block table selector 266 are included for selecting a corresponding table from the invoice 110-1 for further processing. One or more heuristics or rules are applied on the output predictions of the value predictor models 164 for selecting tables. The table selector 226 can select a first table from the multiple tables based on the application of the rules on the first set of prediction. A block table selector 266 may select a second table from the multiple tables using the same rules on the second set of predictions. In an example, the table selector 226 and the block table selector 266 may select the same table i.e., the first table and the second table are the same table, although this is not necessary. The selected table(s) from the table selector 226 and a block table selector 266 are correspondingly provided to the missing values identifier 228 and the block missing values identifier 268. Since predictions from the value predictor models 164 are not 100% accurate, it can occur that certain entity names and entity values are detected while others may not be recognized or may even be left out of the extracted data. Hence, application of additional rules or heuristics on top of the predicted data can improve accuracy of data extraction processes. Missing value identification involves identifying entities or entity values with higher confidence levels and anchoring the remaining entity values and/or line items on the entities with the higher confidence levels. Furthermore, DIV tags from the markup format document 122 can also be involved in the missing value identification. Additionally, the missing headers or the headers that the value predictor models 164 failed to identify, can be selected from a default dictionary using criteria such as the data types of the entity values or line items associated with the missing headers, etc.

Figure 3:
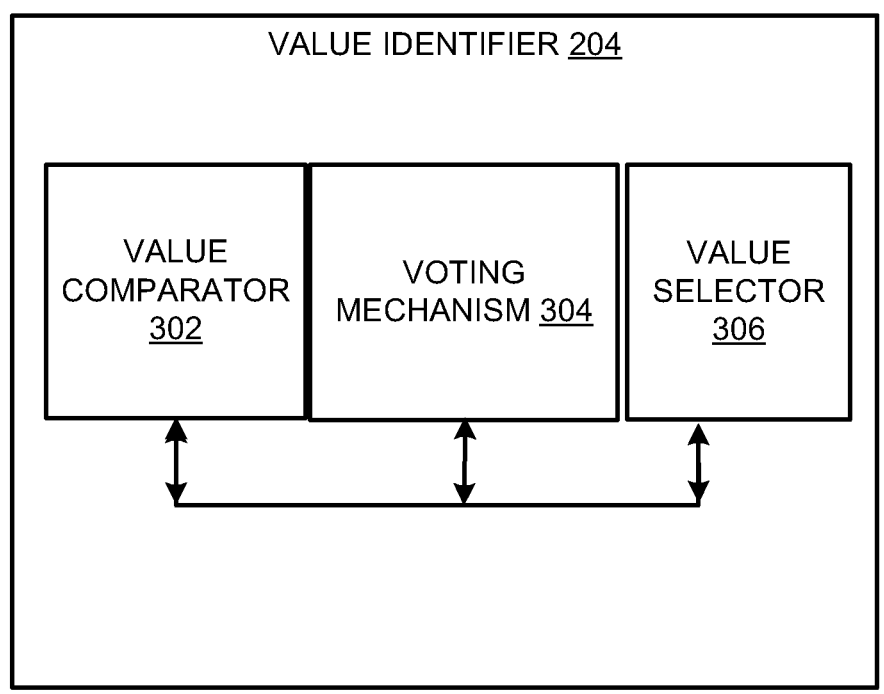
FIG. 3 shows a block diagram of a value identifier in accordance with the examples disclosed herein.

Upon completing the missing values, the data from the missing values identifier 228 and the block missing values identifier 268 is provided to the post processor 232 and the block post processor 272 that implement various post processing procedures such as cleaning up of data rectify any errors that may have occurred during the OCR, resolving space issues and addressing other string based errors wherein certain values are misinterpreted (e.g., '0' is represented as 'o' or vice versa), etc. The extracted data which is processed is correspondingly provided to the line item aligner 234 and the block line item aligner 274 correspondingly from the post processor 232 and the block post processor 272. The line item alignment includes extracting details of the horizontal and vertical alignment of the detected line items with the corresponding table headers. As mentioned above, the document processing system 100 is configured to accurately identify the correspondence of line items in overflowing tables. Again, the line item alignment includes generation of a coordinate-based matrix for a given page and each pixel in the page is identified by a vertical and horizontal coordinates which enable identifying appropriate headers. For example, the headers associated with the line items can be determined using the horizontal coordinates of the pixels of one of the headers that may coincide with the horizontal coordinates of the pixels at the beginning of the line item(s). In some examples, some entity values are frequently lined up in a specific direction so that such values which are identified from the surrounding portion of the entity name in the invoice 110-1 are automatically associated as that entity value. For example, the entity value for invoice number is frequently given below the label and hence a value encountered immediately below the invoice number label is automatically identified as the value for the invoice number. Similarly, the value for the bill of lading is mostly provided to the right of the label and hence an alphanumeric value encountered to the right of the label is automatically categorized as the entity value for the bill of lading. In an example, certain entities such as the bill of lading and invoice number, are also validated by a pattern validator (not shown) in order to enforce certain restrictions on the values of these entities. One such example restriction may limit the invoice number to be more than 3 characters but less than 16 characters, etc. Furthermore, position of DIV tags from the markup format document 122 can also be used for line item alignment. FIG. 3 shows a block diagram of the value identifier 204 in accordance with the examples disclosed herein. The value identifier 204 includes a value comparator 302, a voting mechanism 304 and a value selector 306. The value comparator 302 compares each of the entity values and the line items in the first set of predictions extracted by the document processor 202 with the corresponding values in the second set of predictions extracted by the block processor 252. When it is determined that the values differ, the confidence scores given by the corresponding value predictor models along with the predicted label or value is used for voting/selecting the value. The voting mechanism 304 is therefore operated based on the confidence scores for each of the entity values. The value selector 306 selects one of the values based on the input from the voting mechanism 304.

Figure 4A:
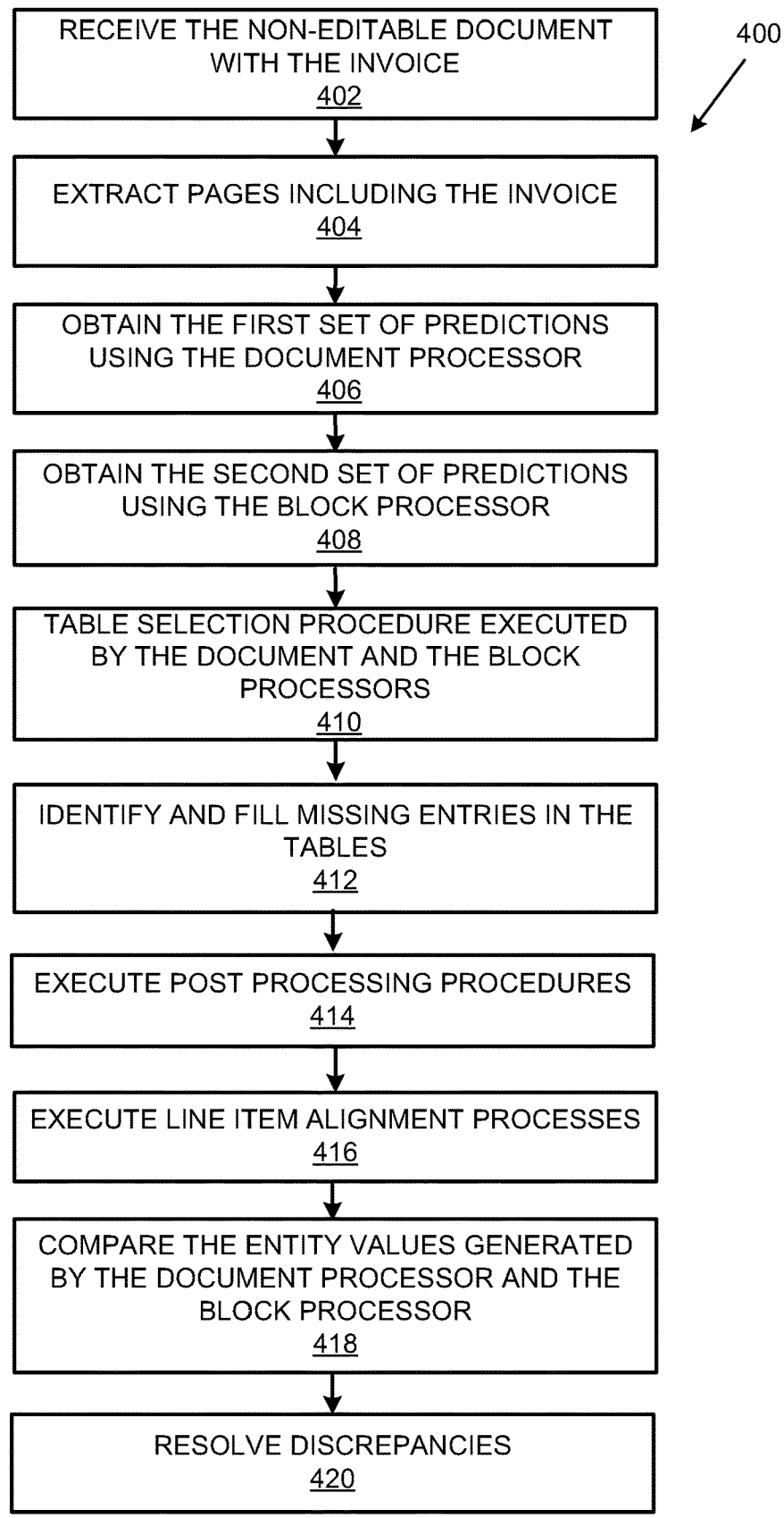
FIG. 4A shows a flowchart that details a method of processing a document in accordance with examples disclosed herein.

FIG. 4A shows a flowchart 400 that details a method of processing a document with errors such as overflowing tables in accordance with examples disclosed herein. The method begins at 402 wherein the non-editable document 110 with multiple pages one or more of which include the invoice 110-1 is received. At 404, the non-editable document 110 is pre-processed to extract the pages including the invoice 110-1. The invoice 110-1 is processed at 406 using the document process to obtain the first set of predictions from the document value predictor models 224. More particularly, the invoice 110-1 which can include one or more pages is parsed in different directions such as top to bottom and/or left to right and the corresponding tokens are generated by the tokenizer 2222. Similarly, the invoice 110-1 is processed at 408 using the block process to obtain the second set of predictions from the block value predictor models 264. The document processor 202 is better configured to capture adjacent sequences, therefore entities with values on the right of the entity labels such as the Value Added Tax (VAT) no. or the bill of lading no., etc. The block processor 252 is better configured to capturing values that have high chances of being present in the vicinity of the corresponding labels such as address of the invoice issuer, invoice no., etc. For example, a value associated with an entity label occurs below the label may be better captured by the block processor 252.

At 410, a table selection procedure is executed by the table selector 226 in the document processor 202 and the block table selector 266 in the block processor 252. The tables selected by the table selector 226 and the block table selector 266 are further analyzed correspondingly to fill in the missing entries at 412 as detailed further herein. Having anchored the table headers at the top and the words at the bottom or the end of the table and the amount column on the right, the missing entries are read from the text contained in the DIV tags present in this area. The missing entries can include entity values such as the table headers and line item values, etc. A first set of values for the missing entries are generated based on the first set of predictions by the missing values identifier 228 and a second set of values for missing entries are provided by the block missing values identifier 268 based on the second set of predictions. The selected table(s) with the missing entries as generated by the document processor 202 and the block processor 252 are further subjected to post processing procedures at 414 for correcting string errors, spacing issues, etc. Moreover, various transformations can be performed as part of the post processing based on rules framed for specific organizations and particular geographies. For example, values such as dates and currencies which can be expressed differently in different geographies are transformed. At 416 a line item alignment process is further executed by each of the line item aligner 234 and the block line item aligner 274. The entity values including the headers and line items from the document processor 202 are compared to the corresponding entity values from the block processor 252 at 418. Any discrepancy wherein it is found that the value produced by the block processor 252 for an entity does not equal the value produced by the document processor 202 for the same entity is resolved at 420 and the extracted values are forwarded in the appropriate formats (as spreadsheets or markup documents, etc.) to downstream processes.

Figure 4B:
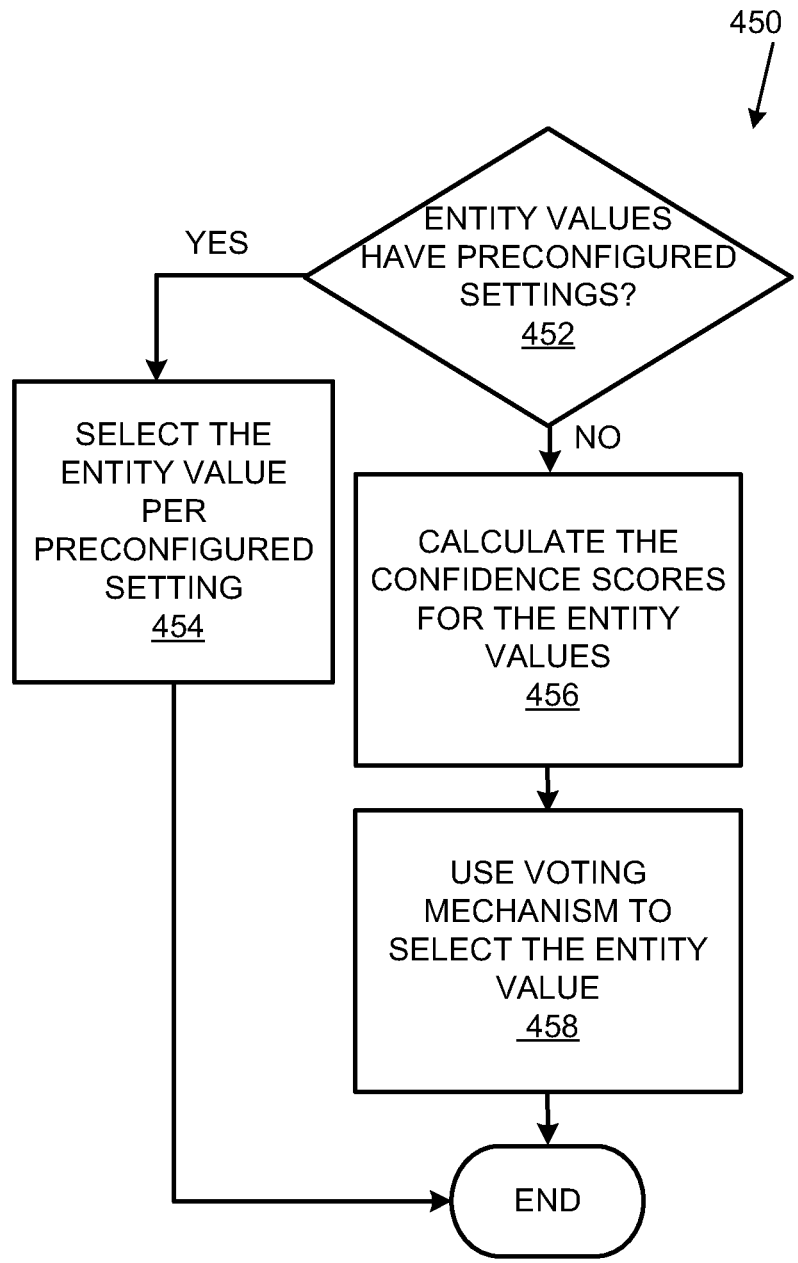
FIG. 4B shows a flowchart that details a method of resolving the discrepancies in the entity values in accordance with the examples disclosed herein.

FIG. 4B shows a flowchart 450 that details a method of resolving the discrepancies upon comparison of the entity values in accordance with the examples disclosed herein. At 452, it is determined if the entity values for the particular entity have preconfigured settings. For example, the value for the 'bill of lading' entity can be preconfigured to be selected as the value that is present immediately to the right of the label. If it is determined at 452 that the value was preconfigured, the preconfigured value is selected at 454 and the discrepancy resolution process terminates on the end block. However, if it is determined at 452 that there are no preconfigured settings for the entity, the method proceeds to 456 wherein the confidence scores for the values from the first set of predictions generated by the document processor 202 and the second set of predictions generated by the block processor 252 are obtained. At 458, a voting mechanism 304 is used to select a value for the entity from the two values produced by the document processor 202 and the block processor 252. Generally, a value associated with the greater confidence score may be selected by the voting mechanism 304 and is output by the value selector 306.

Figure 5:
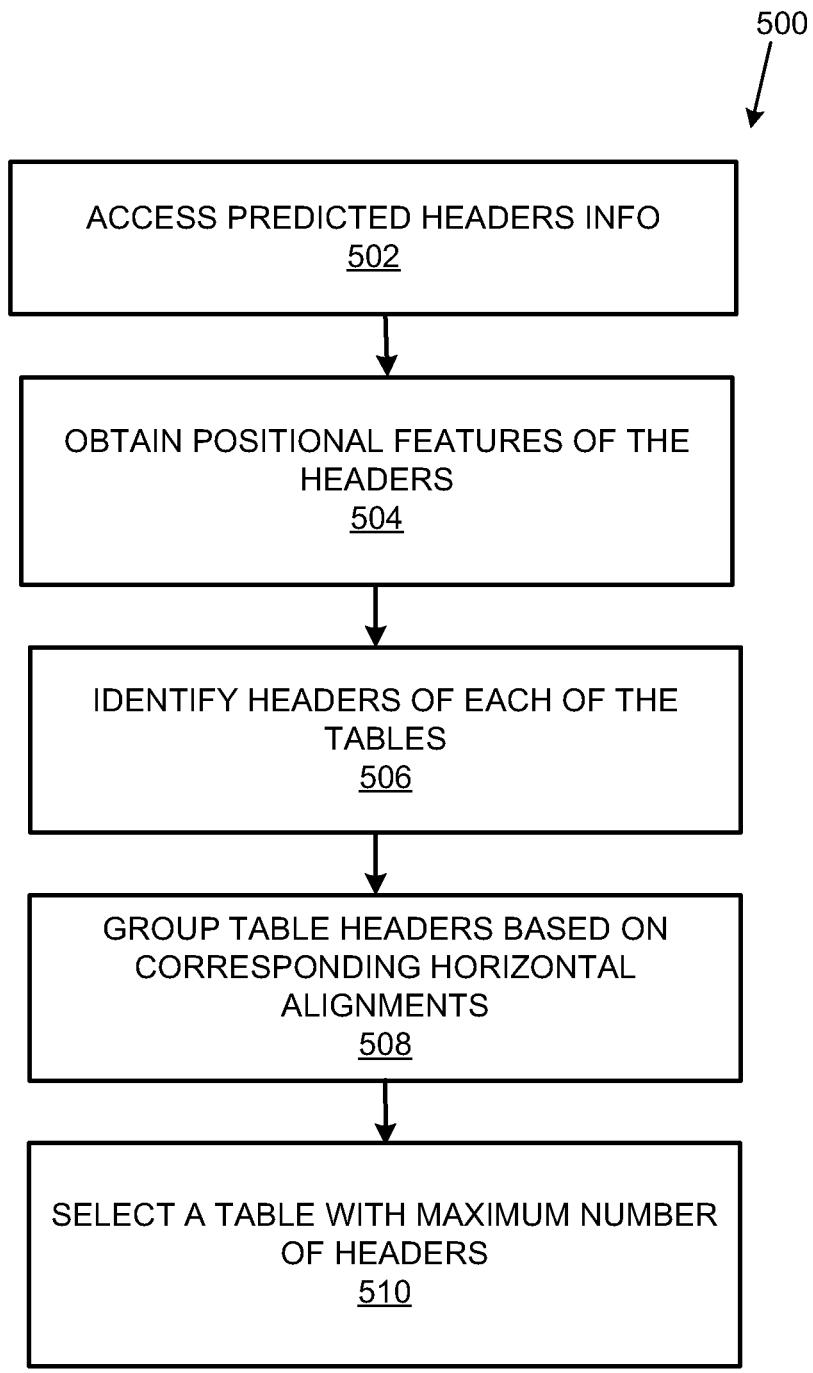
FIG. 5 shows a flowchart that details a table selection process implemented in accordance with the examples disclosed herein.

FIG. 5 shows a flowchart 500 that details a table selection process implemented by the table selector 226 and the block table selector 266 in accordance with the examples disclosed herein. Accordingly, the most important table within an invoice is identified in terms of table headers and further processed. At 502, the table headers as predicted by the value predictor models 164 are accessed. The positional feature sequences associated with the table headers are obtained at 504. The positional feature sequences include location information of the table headers within the page including the invoice 110-1 in terms of pixel data. Using the coordinates of the header pixels, the headers of each of the tables within the invoice 110-1 are identified at 506. At 508, the table headers are grouped based on corresponding horizontal alignments as indicated by position coordinates of the pixels associated with the table headers. The table with the maximum number of headers is identified and selected at 510 for further processing. The document processing system 100 therefore applies certain rules to the ML predictions for the table selection procedure in order to improve the accuracy of the extracted data.

Figure 6:
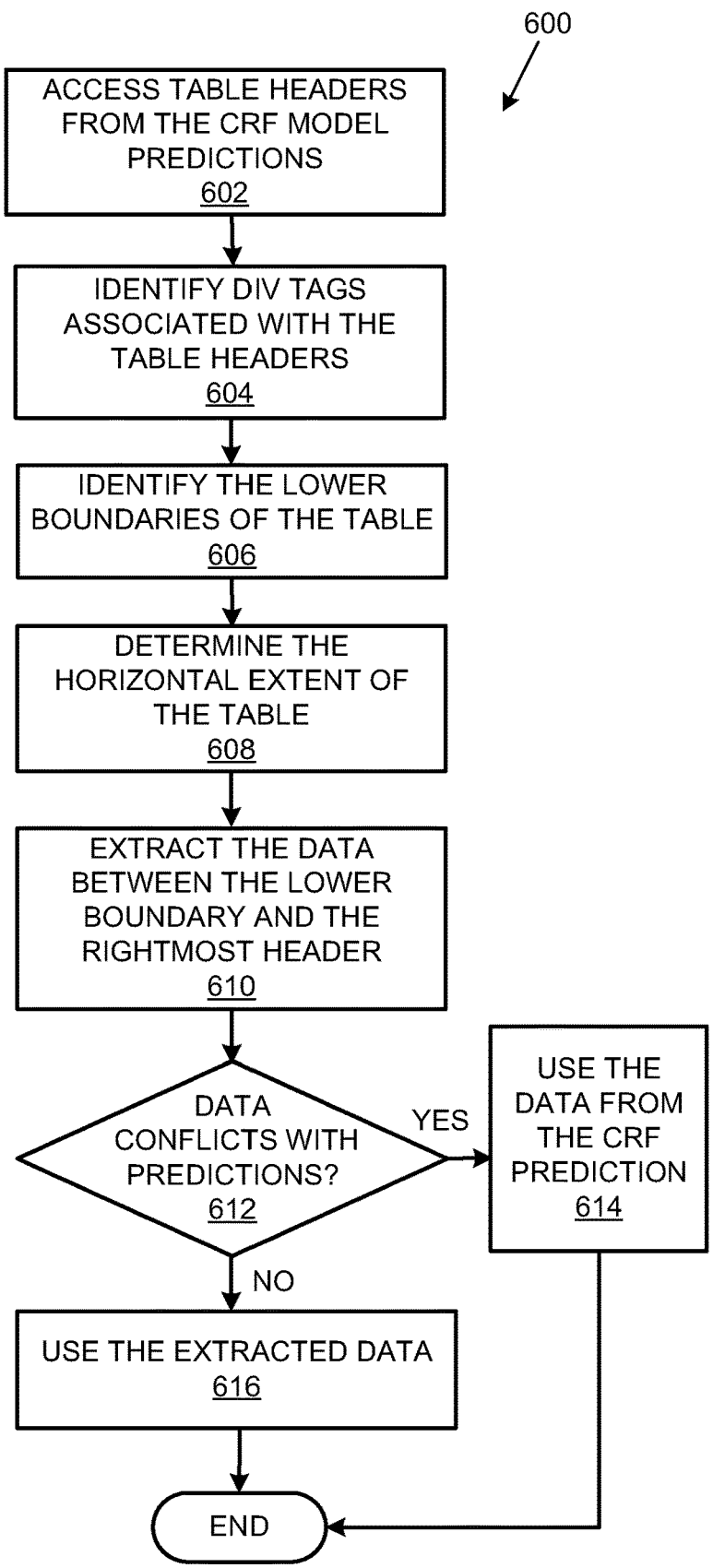
FIG. 6 shows a flowchart that details a method of completing tables in accordance with the examples disclosed herein.

FIG. 6 shows a flowchart that details a method of completing tables by identifying and filling in missing entries implemented by the missing values identifier 228 and the block missing values identifier 268 in accordance with the examples disclosed herein. The table completion process is anchored on the field values extracted from the invoice 110-1 that have less variance such as the table headers. This is because the various invoices across different organizations and geographies tend to have common table headers such as charge description, amount, etc. Hence, the value predictor models 164 tend to have higher confidence scores and lesser variances for table headers. Positional and textual features of the table headers are further employed for table completion. The table headers are accessed from the predictions generated by the value predictor models 164 at 602. At 604, the DIV tags associated with the table headers are identified from the markup format document 122 for horizontal and vertical alignment. The <div> tag defines a division or a section in a HTML document and is often used as a container for other HTML elements. The <div> tag can be used to create tables in the markup format document 122. For the vertical alignment, the lower boundaries at the bottom of the table are identified at 606. The lower boundaries can be defined by a dictionary of terms or a list of words such as "total", "sub-total", "tax", etc. Similarly, the horizontal extent of the table can be determined by the rightmost header at 608. Again, the positional features of the headers as defined by the pixel coordinates can be employed to determine the rightmost header. The data that is contained within the various DIV containers between the rightmost header and the lower boundary is extracted at 610. At 612, it is determined if there is a conflict for a particular entry between the prediction from the value predictor models 164 and a value identified by the horizontal and vertical line item alignment procedure as described above. If it is determined at 612 that there is a conflict, then the CRF model prediction value is selected at 614 and the method terminates on the end block. If it is determined at 612 that there is no conflict, then the value identified from the line alignment process (which is the same as the value prediction by the value predictor models 164) is output for the particular line item at 616. The missing item identification process described herein can be used to identify missing items for tables that can span multiple pages.

FIG. 7 shows an example invoice page 700 that is analyzed in accordance with the examples disclosed herein. The invoice page 700 shows multiple issues that the document processing system 100 is typically configured to solve. Initially, the invoice page include multiple tables 702, 704 and 706. The table 706 is an overflow table with contents of multiple columns leaking into the adjacent columns. For example, contents of the first column overflow beyond the dividing line into the second column at 712. Similarly, contents including line item text from the second column overflow into the third column at 714 and the contents of the third column overflow into the fourth column at 716. The processing of the invoice page 700 using the ML techniques with rules as described herein enables accurately extracting the line items from the different columns and aligning them with the corresponding headers accurately despite the overflows.

FIG. 8 shows a diagram including another invoice 800 illustrating the various aspects of document analysis by the document processor 202 and the block processor 252 in accordance with the examples disclosed herein. The invoice 800 is analyzed by the block processor 252 in terms of logical data structures including the example blocks 802, 804, etc. whereas the entire invoice 800 may be analyzed in different directions by the document processor 202. Accordingly, the block processor 252 is better configured to capture fields and values such as 802, 804, etc. wherein the values e.g., the value "BREX1405132" associated with the corresponding labels e.g., the label "Invoice" are in the vicinity e.g., values are below the field labels. On the other hand, the document processor 202 is better configured to capture left to right sequences such as the VAT No, 806, the Bill of Lading 808 and the container numbers 810.

FIG. 9 shows an invoice 900 with different tables and the table that is selected for further processing in accordance with the examples disclosed herein. The invoice 900 includes multiple tables 902, 904, 906 and 908. Each of the tables 902, 904, 906 and 908 includes different number of columns. The table 908 includes seven columns which is the maximum number of columns for the tables included in the invoice 900. Hence, the table 908 would be selected for further processing by the table selector 226 and the block table selector 266.

FIG. 10 shows an invoice 1000 that is processed for alignment accuracy for tabular information in accordance with the examples disclosed herein. As mentioned above, the document processing system 100 improves upon the results from the ML models by enhancing data extraction and alignment accuracy for tabular information by employing rules on top of the output from the value predictor models 164. The table completion procedure is anchored on one or more confident fields which have higher confidence scores such as the table headers along with using positional and textual features. The table headers such as the 'size/type' 1002, 'Charge Description' 1004, 'Based on' 1006, Rate Currency '1008', 'Amount' 1012 and 'Amount in USD' 1014 are predicted by the value predictor models 164. The missing values identifier 228 and the block missing values identifier 268 complete the table by aligning the text containers (defined by the DIV tags) horizontally and vertically. The rightmost amount column, 1014 refers to the valid set of values for fields like currency if multiple amounts that are detected. The lower table boundaries are based on dictionary words or configurable list of fields that occur commonly within invoices such as "Total", etc. In case of conflict between the values from the alignment procedures versus the model predictions, that model predictions take precedence for output to complete the table.

Figure 11:
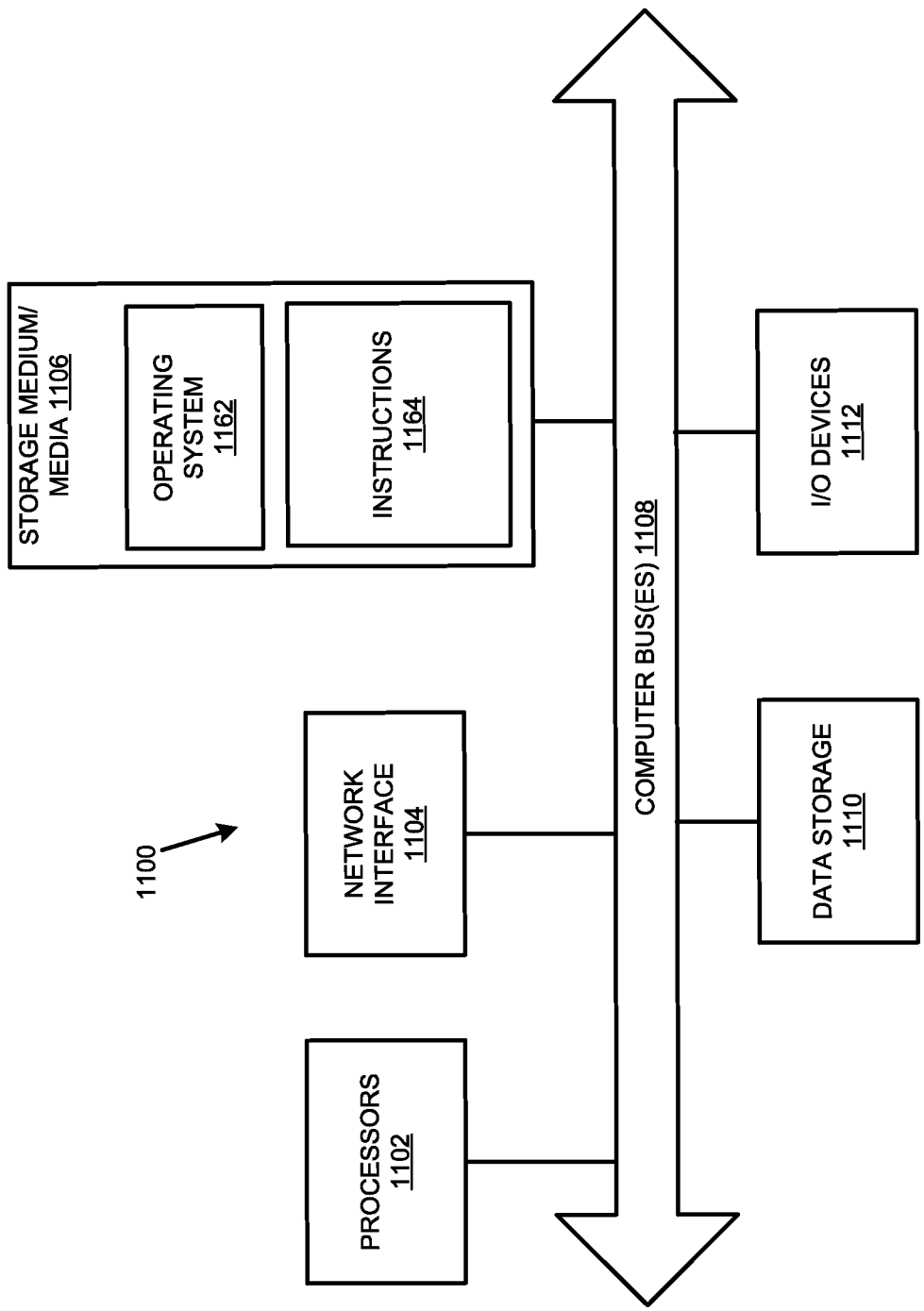
FIG. 11 illustrates a computer system that may be used to implement the rule-based AI document processing system in accordance with the examples disclosed herein.

FIG. 11 illustrates a computer system 1100 that may be used to implement the document processing system 100. More particularly, computing machines such as desktops, laptops, smartphones, tablets and wearables which may be used to generate or access the data from the document processing system 100 may have the structure of the computer system 1100. The computer system 1100 may include additional components not shown and that some of the process components described may be removed and/or modified. In another example, a computer system 1100 can sit on external-cloud platforms such as Amazon Web Services, AZURE® cloud or internal corporate cloud computing clusters, or organizational computing resources, etc.

The computer system 1100 includes processor(s) 1102, such as a central processing unit, ASIC or other type of processing circuit, input/output devices 1112, such as a display, mouse keyboard, etc., a network interface 1104, such as a Local Area Network (LAN), a wireless 802.11x LAN, a 3G or 4G mobile WAN or a WiMax WAN, and a computer-readable medium 1106 (also referred to herein as a processor-readable medium or storage medium/media). Each of these components may be operatively coupled to a bus 1108. The computer-readable medium 1106 may be any suitable medium that participates in providing instructions to the processor(s) 1102 for execution. For example, the processor-readable medium 1106 may be non-transitory or non-volatile medium, such as a magnetic disk or solid-state non-volatile memory or volatile medium such as RAM. The instructions or modules stored on the processor-readable medium 1106 may include machine-readable instructions 1164 executed by the processor(s) 1102 that cause the processor(s) 1102 to perform the methods and functions of the document processing system 100.

The document processing system 100 may be implemented as software stored on a non-transitory processor-readable medium and executed by the one or more processors 1102. For example, the processor-readable medium 1106 may store an operating system 1162, such as MAC OS, MS WINDOWS, UNIX, or LINUX, and code 1164 for the document processing system 100. The operating system 1162 may be multi-user, multiprocessing, multitasking, multithreading, real-time and the like. For example, during runtime, the operating system 1162 is running and the code for the document processing system 100 is executed by the processor(s) 1102.

The computer system 1100 may include a data storage 1110, which may include non-volatile data storage. The data storage 1110 stores any data used by the document processing system 100. The data storage 1110 may be used to store the non-editable document 110, the XML file 172, the validated data 184 and other data that is used by the document processing system 100 during the course of operation.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A hybrid rule-based Artificial Intelligence (AI) document processing system comprising:
at least one processor;
a non-transitory processor readable medium storing machine-readable instructions that cause the processor to:
convert a non-editable document into a markup format document; wherein the non-editable document includes at least an invoice with one or more tables having table headers and line items;
generate a set of document feature sequences using a document process by parsing the invoice in different directions;
generate a set of block feature sequences using a block process that identifies logical information blocks within the invoice;
obtain a first set of predictions for one or more of the headers and the line items from one or more sequence labelling value predictor models using the set of document feature sequences;
obtain a second set of predictions for one or more of the headers and the line items from the one or more sequence labelling value predictor models using the set of block feature sequences;
provide a first set of values for missing entries in a selected table of the one or more tables using the first set of predictions;
provide a second set of values for the missing entries in the selected table using the second set of predictions;
select a value for each of the missing entries from one of the first set of values or the second set of values based on a voting mechanism; and
transmit an output including the table headers and the line items completed based on the voting mechanism as input to a downstream process.

2. The document processing system of claim 1, wherein the processor is to further:
identify the invoice from a plurality of pages included in the non-editable document using a page classifier; and
employ a trained classifier for identifying the invoice wherein the invoice spans one or more pages from the plurality of pages.

3. The document processing system of claim 1, wherein the processor is to further:
select one of the one or more tables for further processing based on rules by:
grouping headers that are horizontally aligned for each of the one or more tables; and
identifying as the selected table, one of the one or more tables having a maximum number of the grouped headers.

4. The document processing system of claim 1, wherein to generate the set of document feature sequences, the processor is to:
tokenize output obtained from executing an optical character recognition (OCR) on a page including the invoice;
obtain textual feature sequences that include for each token, a first predetermined number of preceding tokens, a second predetermined number of succeeding tokens and a type of data in the token; and
obtain positional feature sequences that include for each token, an extent of the token within the invoice, wherein the extent is defined by location coordinates of a top left pixel identifying a beginning of the token and a bottom right pixel identifying an end of the token.

5. The document processing system of claim 1, wherein to generate the set of block feature sequences, the processor is to:
tokenize output obtained from the markup format document wherein each of the blocks includes a label for an entity and a probable value for the entity;
obtain textual feature sequences that include for each token, a first predetermined number of preceding tokens, a second predetermined number of succeeding tokens and a type of data in the token; and
obtain positional feature sequences that include for each token, an extent of the token within the invoice, wherein the extent is defined by position coordinates of a top left pixel identifying a beginning of the token and a bottom right pixel identifying an end of the token.

6. The document processing system of claim 1, wherein to obtain the first set of predictions and the second set of predictions, the processor is to:
  train the one or more sequence labelling value predictor models using explicitly labelled training data which includes prior invoices that have annotated headers and line items, wherein the one or more sequence labelling value predictor models are based on conditional random fields (CRF) method.

7. The document processing system of claim 6, wherein the one or more CRF-based value sequence labelling predictor models includes at least one document CRF value predictor model and at least one block CRF value predictor model.

8. The document processing system of claim 7, wherein to obtain the first set of predictions from the document CRF value predictor model the processor is to:
  generate the set of document feature sequences by parsing the invoice from left to right and top to bottom.

9. The document processing system of claim 1, wherein to select the value for each entry of the missing entries the processor is to:
  for each of the missing entries:
  compare a value values obtained for the missing entry from the first set of values and with a value obtained for the missing entry from the second set of values; and
  employ the voting mechanism based on confidence scores for selection of one of the value obtained for the missing entry from the first set of values or the value obtained for the missing entry from the second set of values if the value for the missing entry in the first set of values differs from the value for the missing entry in the second set of values.

10. The document processing system of claim 1, wherein to select the value for one or more of the missing entries the processor is to:
  default to selecting the value from one of the first set of predictions or the second set of predictions based on preconfigured settings for specific fields.

11. The document processing system of claim 1, wherein the processor is to further:
  complete the selected table by aligning text containers defined by div tags in the markup format document horizontally and vertically wherein the alignment of the text containers is based on the headers predicted by the one or more sequence labelling value predictor models.

12. The document processing system of claim 11, wherein the processor is to further:
  identify lower table boundaries based on a configurable list of dictionary words.

13. The document processing system of claim 11, wherein the processor is to further:
  create a coordinate based matrix for the invoice wherein the coordinate based matrix includes coordinates for pixels of entries that are indicative of positions of the entries in the invoice in the non-editable document.

14. The document processing system of claim 1, wherein the processor is to further:
  consolidate entities pertaining to various fields across a plurality of pages that include the invoice.

15. The document processing system of claim 1, wherein the selected table is an overflowing table having multiple columns wherein line item text pertaining to a column leaking into a next column.

16. A method of processing a document for data extraction comprising:
  extracting invoice pages from a non-editable document using a page classifier;
  converting the invoice pages to a markup format document;
  generating a set of document feature sequences using tokens obtained by parsing the markup format document in different directions;
  generating a set of block feature sequences using tokens obtained from parsing logical data structures in the markup format document;
  obtaining a first set of predictions from the set of document feature sequences using at least two document value predictor models wherein each document value prediction model processes a subset of the set of document feature sequences, the first set of predictions pertain to entity values including table headers and line items included in the invoice pages;
  obtaining a second set of predictions from the set of block feature sequences using at least two block value predictor models wherein each block value prediction model processes a subset of the set of block feature sequences, the second set of predictions pertain to the entity values including the table headers and the line items included in the invoice pages;
  selecting one or more tables included in the invoice pages using the set of document feature sequences and the set of block feature sequences;
  providing values for missing entries in the selected one or more tables by applying rules to the first set of predictions and the second set of predictions;
  applying one of preconfigured settings or a voting mechanism when the values for one or more of the missing entries provided by the first set of predictions do not equal the values provided by the second set of predictions; and
  enabling execution of a robotic process automation (RPA) process by providing data extracted from the selected one or more tables including the values for the missing entries to a system executing the RPA process.

17. The method of claim 16, wherein selecting the one or more tables includes:
  grouping the table headers based on corresponding horizontal alignments as indicated by position coordinates of pixels associated with the table headers; and
  selecting the one or more tables that have a maximum number of headers in the group.

18. The method of claim 16, wherein the rules applied to the first set of predictions and the second set of predictions include:
  aligning division (DIV) tags from the markup format document associated with the headers horizontally and vertically;
  identifying lower table boundaries using a list of words; and
  selecting the values for the missing entries from a corresponding set of the first set of predictions or the second set of predictions when there is a mismatch between a value identified from aligning the DIV tags and the corresponding set.

19. A non-transitory processor-readable storage medium comprising machine-readable instructions that cause a processor to:
  convert a non-editable document into a markup format document, wherein the non-editable document includes at least an invoice with one or more tables having table headers and line items;

generate a set of document feature sequences using a document process by parsing the invoice in different directions;
generate a set of block feature sequences using a block process that identifies logical information blocks within the invoice;
obtain a first set of predictions for one or more of the headers and the line items from one or more value predictor models using the set of document feature sequences;
obtain a second set of predictions for one or more of the headers and the line items from the one or more value predictor models using the set of block feature sequences;
provide a first set of values for missing entries in a selected table of the one or more tables using the first set of predictions;
provide a second set of values for the missing entries in the selected table using the second set of predictions;
select a value for each of the missing entries from one of the first set of values or the second set of values based on a voting mechanism; and
transmit an output including the table headers and the line items completed based on the voting mechanism as input to a downstream process.

20. The non-transitory processor-readable storage medium of claim 9, further comprising instructions that cause the processor to:
group the table headers based on corresponding horizontal alignments as indicated by position coordinates of pixels associated with the table headers; and
select one of the one or more tables that have a maximum number of headers.

* * * * *

UNITED STATES PATENT AND TRADEMARK OFFICE
CERTIFICATE OF CORRECTION

| | | |
|---|---|---|
| PATENT NO. | : 11,501,549 B2 | Page 1 of 1 |
| APPLICATION NO. | : 16/917572 | |
| DATED | : November 15, 2022 | |
| INVENTOR(S) | : Bade et al. | |

It is certified that error appears in the above-identified patent and that said Letters Patent is hereby corrected as shown below:

In the Claims

At Claim 1, Column 15, Line 59, the phrase "document; wherein" should instead read "document, wherein".

At Claim 9, Column 17, Line 24, the phrase "for each of the missing entries:" should be deleted.

At Claim 9, Column 17, Line 25, the phrase "compare a value values obtained" should instead read "compare a value obtained".

At Claim 20, Column 20, Line 10, the phrase "of claim 9" should instead read "of claim 19".

Signed and Sealed this
Fifth Day of September, 2023

*Katherine Kelly Vidal*
Katherine Kelly Vidal
*Director of the United States Patent and Trademark Office*